United States Patent
Quill

(10) Patent No.: US 7,788,973 B2
(45) Date of Patent: Sep. 7, 2010

(54) COMBINED SIGHT OIL LEVEL GAGE AND ULTRASONIC SENSOR

(75) Inventor: Jeremiah D. Quill, Auburn, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 435 days.

(21) Appl. No.: 12/015,667

(22) Filed: Jan. 17, 2008

(65) Prior Publication Data

US 2008/0173088 A1    Jul. 24, 2008

Related U.S. Application Data

(60) Provisional application No. 60/881,809, filed on Jan. 19, 2007.

(51) Int. Cl.
G01F 23/02    (2006.01)
G01F 23/28    (2006.01)

(52) U.S. Cl. .................. 73/323; 73/290 V

(58) Field of Classification Search ........... 73/290 V, 73/290 R, 323; 417/1
See application file for complete search history.

(56) References Cited

U.S. PATENT DOCUMENTS

| | | | | |
|---|---|---|---|---|
| 2,676,265 A | * | 4/1954 | Green ................ | 378/52 |
| 3,389,603 A | * | 6/1968 | Jacobs, III ............ | 73/308 |
| 3,416,547 A | | 12/1968 | Glenn, Jr. et al | |
| 3,525,231 A | * | 8/1970 | Armstrong ............ | 62/125 |
| 3,908,129 A | * | 9/1975 | Akers ................. | 250/577 |
| 4,107,993 A | * | 8/1978 | Shuff et al. ........... | 73/290 R |
| 4,440,022 A | * | 4/1984 | Masom ............... | 73/293 |
| 5,103,648 A | * | 4/1992 | Barbier .............. | 62/126 |
| 5,351,036 A | * | 9/1994 | Brown et al. .......... | 340/618 |
| 5,785,100 A | | 7/1998 | Showalter et al. | |

(Continued)

FOREIGN PATENT DOCUMENTS

DE    7 701 829    7/1977

(Continued)

OTHER PUBLICATIONS

German Office Action dated Sep. 1, 2009 issued in counterpart German patent application No. 10 2008 005 848.3-52 (6 pages) and English language translation thereof (5 pages).

(Continued)

Primary Examiner—John Fitzgerald

(57) ABSTRACT

The invention provides a combined fluid level sight gage and ultrasonic sensor featuring a fluid level sight gage having a housing for containing a fluid and having a sight glass for viewing the level of the fluid therein, and an ultrasonic sensor coupled to the housing, responsive to the level of fluid in the housing, for providing an ultrasonic sensor signal containing information about the level of fluid in the housing. In operation, the sight glass provides a visual verification that the ultrasonic sensor is working correctly in relation to the fluid visible in the sight glass. The ultrasonic sensor signal may be used to automatically annunciate alarms or warnings either locally at the equipment or by wired or wireless electronic means. In some embodiments according to the present invention, the housing has a centerline for indicating a normal fluid level therein. The ultrasonic sensor may be arranged in the housing on the centerline, or slightly below the centerline, or slightly above the centerline.

18 Claims, 4 Drawing Sheets

U.S. PATENT DOCUMENTS

| | | | |
|---|---|---|---|
| 5,986,449 A * | 11/1999 | Koski | 324/207.13 |
| 6,151,956 A | 11/2000 | Takahashi et al. | |
| 6,617,968 B1 | 9/2003 | Odisho et al. | |
| 6,693,285 B1 | 2/2004 | Weiss | |
| 6,791,334 B2 | 9/2004 | Horie et al. | |
| 6,902,082 B2 | 6/2005 | Mabry et al. | |
| 7,064,560 B2 | 6/2006 | Yamamoto et al. | |
| 7,114,391 B2 | 10/2006 | Sasaki et al. | |
| 7,610,807 B2 * | 11/2009 | Skinner | 73/319 |
| 2002/0166759 A1 | 11/2002 | Mabry et al. | |

FOREIGN PATENT DOCUMENTS

EP    1 524 505    4/2005

OTHER PUBLICATIONS

Computer-generated partial English language translation of specification of DE 7 701 829 (1 page).

* cited by examiner

*FIG. 1*: The Basic Pump System

COMBINED SIGHT OIL LEVEL GAGE AND ULTRASONIC SENSOR

CROSS-REFERENCE TO RELATED APPLICATION

This application claims benefit to provisional patent application Ser. No. 60/881,809, filed 19 Jan. 2007, which is hereby incorporated by reference in its entirety.

BACKGROUND OF THE INVENTION

1. Technical Field

The present invention generally relates to a sensor or gage; and more particularly to a sensor or gage for arranging in a bearing frame or housing of a pump forming part of a pumping system.

2. Description of Related Problem There are several commonly employed methods for determining the fluid level, e.g. oil, in bearing frame housing of rotating equipment:

For example, a sight glass oil level gauge may be screwed into the bearing housing in such a way that the center of the gage is located at the desired oil level. The gage uses a transparent glass or plastic window 6 to view the oil level. FIG. 8 shows, by way of example, one such known gage generally indicated as 5. The correct oil level is achieved when the level of oil seen through the transparent window 6 coincides with a level mark built into the gage. The sight glass oil level gage may employ a small baffle with a hole 7, stamped or drilled in the center. However, the disadvantage of the sight glass oil level is that it requires a person to visually check the oil level. The level must be checked at regular intervals.

Capacitive sensors may determine the oil level by measuring the capacitance between plates or coils immersed in the oil. The presence of oil between the sensor plates or electrodes is reflected in a change in capacitance. The capacitance is determined by some type of electronic device that equates the capacitance to the oil level. Moreover, inductive or capacitive sensors are known that are typically screwed into the bottom of the bearing housing. The sensor's length is such that it protrudes through the oil. The oil level is inferred by measuring the inductance or capacitance of the sensor. This type of sensor can be used to automatically annunciate alarms or warnings on low or high oil level, when attached to a personal computer (PC), a supervisory control or data acquisition (SCADA) system or a distributed control system (DCS). The inductive or capacitive sensors must be available in many lengths to accommodate all of the different bearing house designs. To determine the oil level or change in oil level, a reference capacitance must be taken for each housing design. Most times this type of sensor is screwed into the oil drain hole plug connection, which necessitates removing wire, etc. when draining the oil. Otherwise, an extra plug connection on the bottom of the housing is required. The disadvantage of the capacitive sensors is that it may or may not give a correct indication of oil level depending on the presence of contamination in the oil and the correct calibration and set-up of the sensor. There is no way to verify that the level is correct. The oil level is determined by measuring capacitance between plates or probes immersed in the oil. The capacitance is determined in part by the dielectric properties of the oil and air. Unfortunately, the difference between the dielectric constant of oil versus air is small. Air has a dielectric constant of 1 and common mineral oils have a dielectric constant of 2. Water has a dielectric constant ranging from 48 to 88. If the oil is contaminated with even small amounts of water the dielectric properties are drastically altered making oil level measurements inaccurate or suspect at best.

A level plug may be located horizontally in the bearing housing so that the bottom of the threaded hole is at the desired oil level. The level is checked by removing the plug. If oil flows out, the level is too high. If the oil is seen at the bottom threads, then the oil level is correct; and if oil is not seen, then the oil level is low. This method is commonly used on transmissions and gear boxes. However, the disadvantage of the level plug is that it requires a person to physically remove a plug with some type of tool and visually check for the presence of oil. Removing the plug exposes the oil to liquid or solid contaminants that may be around the plug.

Dip sticks are also commonly used on internal combustion engines to determine the correct oil level. The stick which has marks or lines or holes placed at the desired oil level on the stick. Removing the dip stick from the dip tube and observing the location of the residual oil in relation to the markings on the stick gives an indication of the oil level. However, the disadvantage of using a dip stick to monitor oil level is that it requires a person to physically remove the stick, wipe off the oil, reinsert the stick, remove the stick and match the wetted oil line with the marking on the stick. This also exposes the oil to contamination from the surroundings.

Other known level sensing techniques include that disclosed in U.S. Pat. No. 4,152,937, which provides for a liquid level sensor having a level mutual inductance probe with primary and secondary windings wound coextensively inside a closed end tubular protective housing; as well as that disclosed in U.S. Pat. No. 6,520,011, which provides for a powder detecting capacitive type sensor having a sensor body having a pair of electrodes inside and a circuit that detects a change of capacitance between the electrodes so as to detect the existence of powder adjacent the sensor body, where the sensor is arranged on a wall of a powder tank.

SUMMARY OF THE INVENTION

The present invention provides a new and unique combined fluid level sight gage and ultrasonic sensor featuring a fluid level sight gage having a housing for containing a fluid and having a sight glass for viewing the level of the fluid therein, and an ultrasonic sensor coupled to the housing that responds to the level of fluid in the housing, and provides an ultrasonic sensor signal containing information about the level of fluid in the housing. In operation, the sight glass provides a visual verification that the ultrasonic sensor is working correctly in relation to the fluid visible in the sight glass. The ultrasonic sensor signal may be used to automatically annunciate alarms or warnings either locally at the equipment or by wired or wireless electronic means.

In some embodiments according to the present invention, the housing has a centerline for indicating a normal fluid level therein. The ultrasonic sensor may be arranged in the housing on the centerline, or slightly below the centerline, or slightly above the centerline.

Embodiments are also envisioned in which the combined fluid level sight gage and ultrasonic sensor features a plurality of ultrasonic sensors, where each ultrasonic sensor is arranged at a different position in relation to the centerline. For example, one ultrasonic sensor may be positioned on the centerline, and another ultrasonic sensor may be positioned slightly above or below the centerline.

The present invention also provides for a new and unique pump having a bearing frame or housing with the combined fluid level sight gage and ultrasonic sensor arranged therein, as well as a new and unique pump controller that responds to such an ultrasonic sensor signal, for either controlling the operation of the pump, for providing either an audio or visual warning, or some combination thereof. The present invention also provides a new and unique pump system featuring such a combined fluid level sight gage and ultrasonic sensor in combination with such a pump controller.

Furthermore, the present invention also provides a new and unique method featuring steps of arranging a combined fluid level sight gage and ultrasonic sensor having a fluid level sight gage with a housing for containing a fluid and a sight glass for viewing the level of the fluid therein; sensing with an ultrasonic sensor coupled to the housing the level of fluid in the housing; and providing an ultrasonic sensor signal containing information about the level of fluid in the housing. The method may also feature steps for responding to the ultrasonic sensor signal; and either controlling the operation of the pump, or providing either an audio or visual warning, or some combination thereof.

This invention overcomes the above shortcomings of the prior art techniques when attempting to determine the oil level in a piece of rotating equipment. Combining a sight glass oil level gauge with an ultrasonic sensor provides a visual indication of the oil level as well as an electronic output that can be used to automatically annunciate alarms or warnings. Annunciation can be provided both locally at the equipment and remotely by wired or wireless electronic means. The sight glass oil level gage also gives a visual verification that the ultrasonic sensor is working correctly. The electronic output of the ultrasonic sensor can be configured to send the alarm or warning to a remote location. As a person skilled in the art would appreciate, the ultrasonic sensor used in the present invention can use the physical principal of acoustic impedance. For example, since the acoustic impedance of air is about zero and the acoustic impedance of oil is about 1.5, the acoustic impedance mismatch can be used to provide the basis for the detection of liquid. Water has an acoustic impedance of 1.5 and most any liquid has acoustic impedance above 1. Any liquid contamination of the oil will not change the acoustic impedance of the oil to the degree that the sensor cannot discriminate between air and liquid. The mismatch in acoustic impedance between air and oil or air and contaminated oil will always be great enough to accurately determine the presence or absence of liquid at the sensor face. The ultrasonic sensor is also tolerant to small solid particulate that may be suspended in the oil.

In its broadest sense, the present invention provides a fluid level sensor featuring a fluid level gage having a housing for containing a fluid in combination with an ultrasonic sensor coupled to the housing, responsive to the level of fluid in the housing, for providing an ultrasonic sensor signal containing information about the level of fluid in the housing. The fluid level gage may also include a sight glass arranged therein for viewing the level of the fluid in the housing. In one particular application, the fluid is a lubricating liquid such as oil that forms part of a bearing frame of rotary equipment, such as a pump.

The foregoing and other objects, features and advantages of the present invention will become more apparent in light of the following detailed description of exemplary embodiments thereof.

BRIEF DESCRIPTION OF THE DRAWING

The drawing is not drawn to scale and includes the following Figures.

BEST MODE FOR CARRYING OUT THE INVENTION

Figure 1:
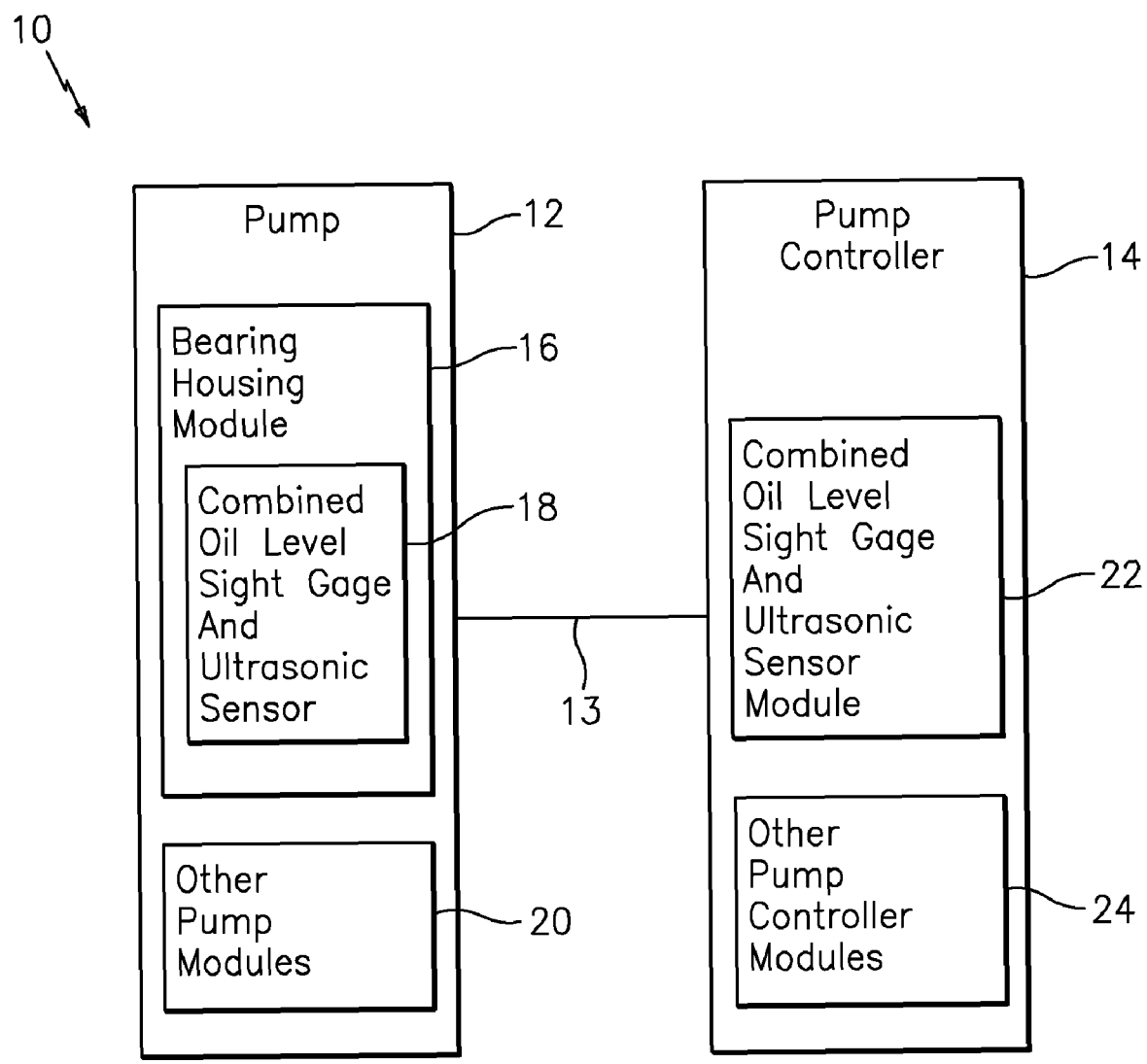
FIG. 1 show a diagram of a basic pump system having a combined fluid level sight gage and ultrasonic sensor according to some embodiments of the present invention.

FIG. 1 shows, by way of example, a pumping system or other suitable rotating equipment generally indicated as 10, having a pump or other suitable rotating device 12 coupled to a pump controller 14 via a line 13 that provides data and control signals between the pump 12 and pump controller 14.

Figure 2:
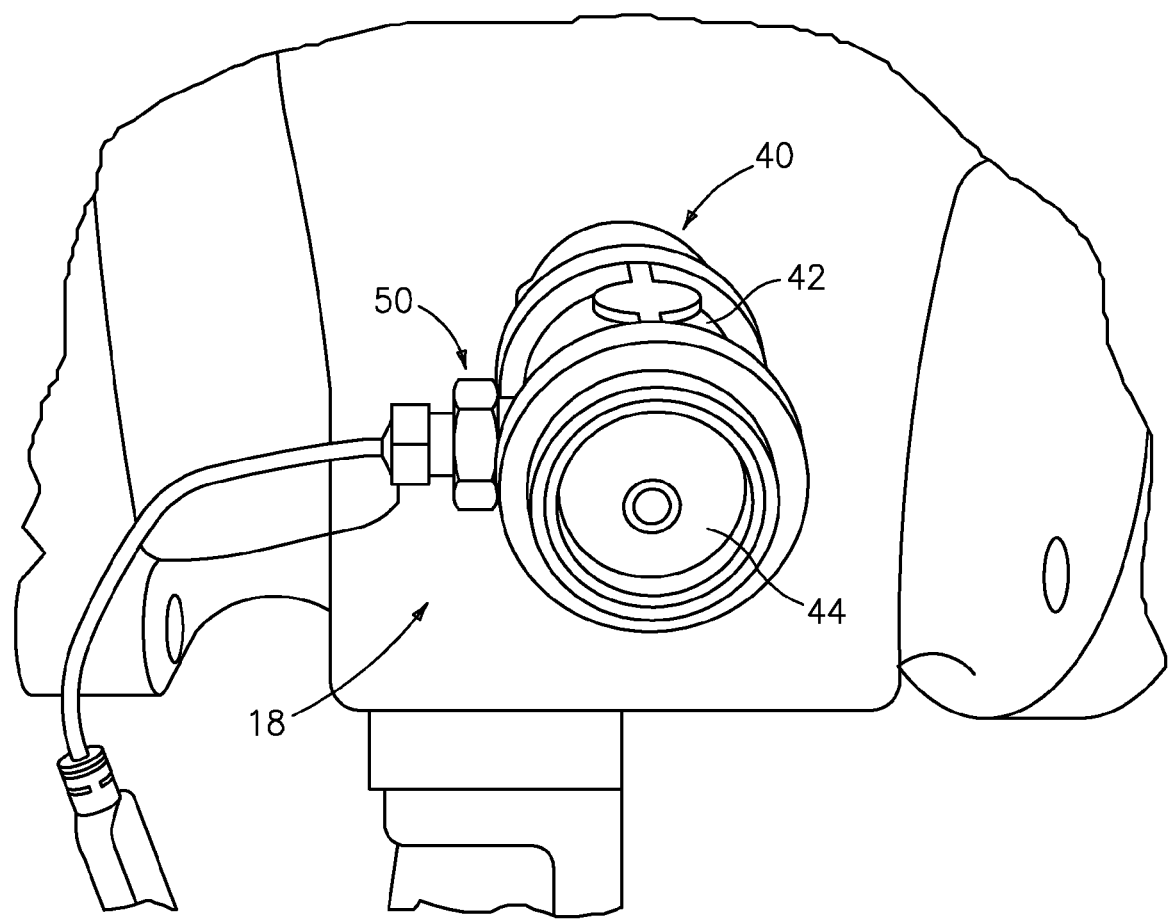
FIG. 2 shows a diagram of a combined fluid level sight gage and ultrasonic sensor according to some embodiments of the present invention arranged on a bearing frame of a pump.
Figure 4:
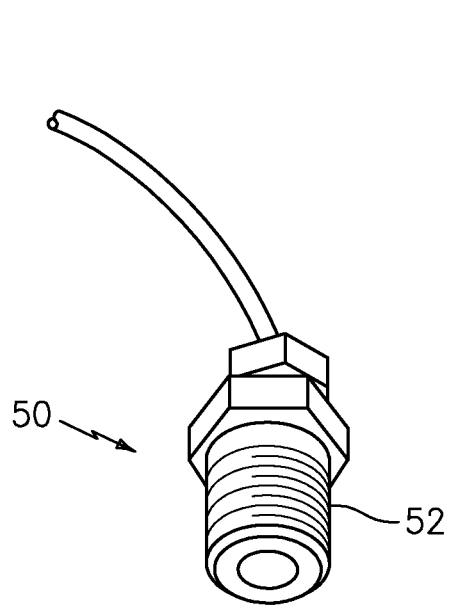
FIG. 4 shows a perspective view of an ultrasonic sensor that forms part of the combined fluid level sight gage and ultrasonic sensor shown in FIG. 2.
Figure 3:
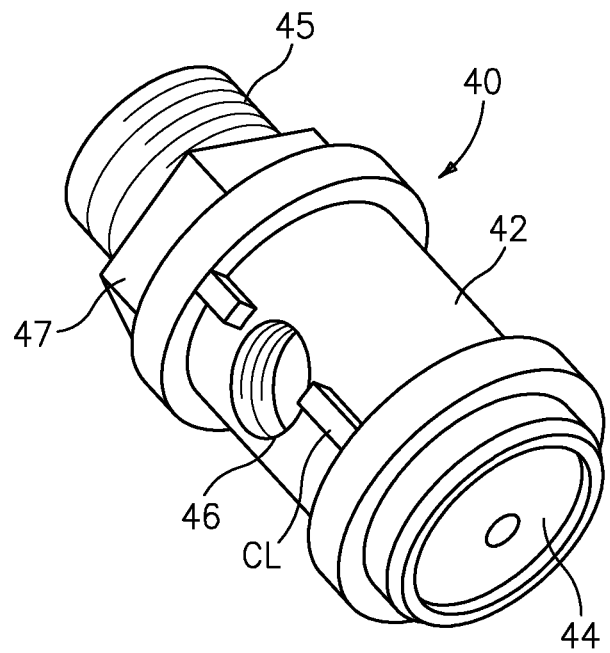
FIG. 3 shows a perspective view of a fluid level sight gage that forms part of the combined fluid level sight gage and ultrasonic sensor shown in FIG. 2.
Figure 8:
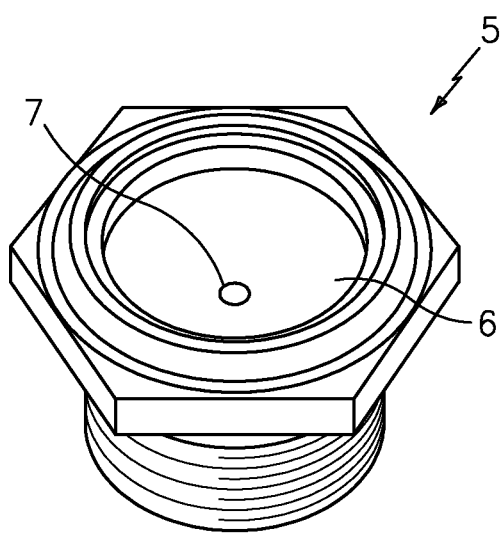
FIG. 8 shows a perspective view of a fluid level sight gage that is known in the art.
Figure 5:
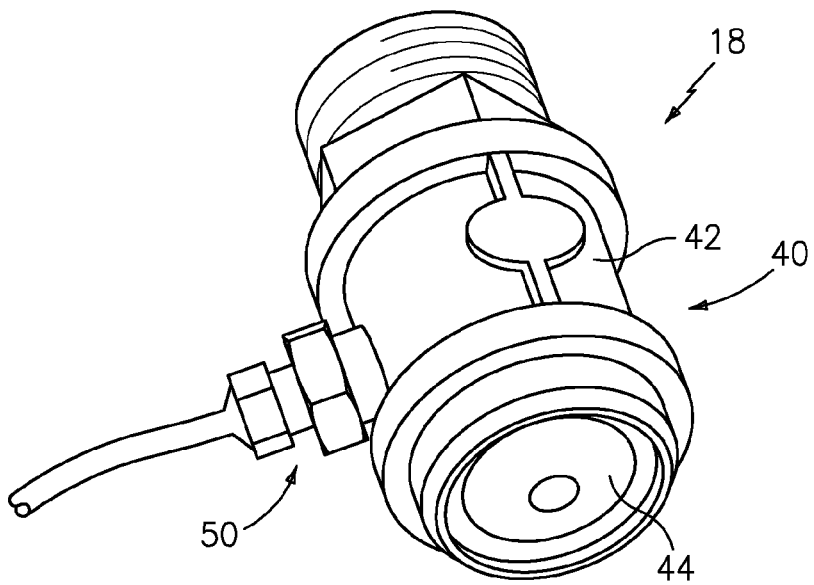
FIG. 5 shows a perspective view of the combined fluid level sight gage and ultrasonic sensor shown in FIG. 2.

The pump 12 includes a bearing frame or housing 16 having a combined oil level sight gage and ultrasonic sensor 18 according to the present invention arranged therein. In operation, consistent with that shown and described herein, the combined oil level sight gage and ultrasonic sensor 18 has a fluid level sight gage 40 with a housing 42 for containing a fluid and having a sight glass 44 for viewing the level of the fluid therein, as best shown in FIGS. 2-3 and 5; and an ultrasonic sensor 50 coupled to the housing that responds to the level of fluid in the housing, for providing an ultrasonic sensor signal containing information about the level of fluid in the housing, as best shown in FIGS. 2, 4 and 5.

In one embodiment, the ultrasonic sensor signal may be provided to the pump controller 14 and used for controlling the operation of the pump 12, including either turning the pump 12 off, or for issuing audio or visual alarms or warnings for low or high oil levels or a contaminated oil condition, for example, consistent with that shown and described herein. The scope of the invention is not intended to be limited to how the oil level or condition sensor signal is used, how the oil level or condition sensor signal is used to control the pump 12, or the type or kind of audio or visual alarms or warnings issued.

The pump 12 may also include other pump modules 20 that are known in the art, that do not form part of the present invention, and thus that are not described in detail herein, including but not limited to a power module for powering the pump 12, as well as other modules either now known or later developed in the future. Moreover, the scope of the invention is intended to include the pump controller 14 being a stand alone module, or instead forming part of one or more of such other pump modules 20. In other words, the scope of the invention is not intended to be limited to where the functionality of the pump controller 14 is implemented.

The pump controller 14 includes a combined oil level sight gage and ultrasonic sensor module 22 that responds to the ultrasonic sensor signal along the line 13 and processes the same for controlling the operation of the pump 12, for example, including either turning the pump 12 off, or issuing the audio or visual alarms or warnings for low or high oil level conditions. Many different types and kind of pump controller and/or monitoring equipment such as 14 for controlling and/or monitoring pumps are known in the art. Based on an understanding of such known modules, a person skilled in the art would be able to implement such a combined oil level sight gage and ultrasonic level sensor module such as 22 therein to perform functionality consistent with that described herein, including either turning the pump 12 off, or issuing the audio or visual alarms or warnings for low or high oil level conditions based on the same by providing the control signal along line 13 to the pump 13, or by providing a data or control signal to an audio module or a display module or some combination that form part of such other pump control modules 24. By way of example, the functionality of such a combined oil level sight gage and ultrasonic sensor module 22 may be implemented using hardware, software, firmware, or a combination thereof, although the scope of the invention is not intended to be limited to any particular embodiment thereof. In a typical software implementation, such a module would be one or more microprocessor-based architectures having a microprocessor, a random access memory (RAM), a read only memory (ROM), input/output devices and control, data and address buses connecting the same. A person skilled in the art would be able to program such a microprocessor-based implementation to perform the functionality described herein without undue experimentation. The scope of the invention is not intended to be limited to any particular implementation using technology known or later developed in the future. Consistent with that described above, embodiments are envisioned in which the functionality of the combined sight oil level gage with an ultrasonic level sensor module 22 is implemented within one or more of the other pump modules 20. Finally, the method or technique for making such a measurement of a fluid level, such as oil, using ultrasound is known in the art and may be implemented by a person skilled in the art without undue experimentation based on the description herein, and the scope of the invention is not intended to be limited to any such method or technique for measuring the same either now know or later developed in the future.

Although the invention is described in relation to sensing the level of oil, e.g. in a bearing frame or housing of a pump, the scope of the invention is not intended to be limited to the type or kind of fluid being sensed.

Embodiments are also envisioned in which the sight glass is visually monitored by a camera that provides a hardwired or wireless camera signal back to the module 22 for allowing remote viewing of the sight glass.

The Implementation

FIGS. 2-5 show one embodiment of the combined oil level sight gage and ultrasonic sensor 18 according to the present invention that is arranged in a bearing frame or housing 30 of a pump. By way of example, the combined oil level sight gage and ultrasonic sensor 18 may be screwed into the housing 30, although the scope of the invention is intended to include other manners, ways or techniques for coupling or securing the combined oil level sight gage and ultrasonic sensor 18 and the housing 30 together that are either now known or later developed in the future.

The combined oil level sight gage and ultrasonic sensor 18 includes an oil level sight gage generally indicated as 40 (see also FIGS. 3 and 5) having a housing 42 for containing a fluid, such as oil, and having a sight glass 44 for viewing the level of the fluid therein. As shown, the oil level sight gage has outer threads 45, tapped mounting hole 46 and a hex configuration 47 for turning the gage 40.

The combined oil level sight gage and ultrasonic sensor 18 also includes an ultrasonic sensor generally indicated as 50 (see also FIGS. 4-5) that is arranged in the side of the housing 42. By way of example, the ultrasonic sensor 50 has outer threads 52 that may be screwed into the tapped mounting hole 46 of the housing 42, although the scope of the invention is intended to include other manners, ways or techniques for coupling or securing the ultrasonic sensor 50 and the housing 42 together that are either now known or later developed in the future. The ultrasonic sensor 50 can be positioned or arranged at a location $\frac{1}{16}$" or $\frac{1}{8}$" or $\frac{1}{4}$" below the centerline CL (see FIG. 3) of the oil level sight gage 40 which would correspond to the lowest safe operating oil level. Consistent with that described above, the ultrasonic sensor 50 provides an electronic annunciation or warning when the level falls below the safe operating oil level setting. The ultrasonic oil level sensor 50 can be positioned at, above or below the centerline CL of the sight oil level gage to provide an electronic annunciation of high, normal or low oil level in the housing 30 of the bearing frame. The location of the tapped mounting hole 46 (see FIG. 3) is not limited to the dimensions or the position described above. The ultrasonic sensor 50 can be located at any location that is physically possible given the dimensions of the oil level sight gage 50.

In another embodiment of the present invention, more than one ultrasonic oil level sensor 50 can be located in the oil level sight gage at differing levels in relation to the center CL (FIG. 3). For example, two ultrasonic oil level sensors 50 can annunciate or warn on any two fluid level conditions; or three ultrasonic oil level sensors can annunciate or warn on three different fluid levels, such as, but not limited to, high, normal and low oil level conditions.

In operation, maintenance personnel, when doing a scheduled walk around, can determine the oil level and to some degree the oil condition or quality by viewing the oil level and color through the transparent window 44 of the oil level sight gage 40. This does not require access to an electronic readout device (not shown). In the event that an electronic annunciation or warning has been initiated by the ultrasonic oil level sensor 50, the maintenance personnel can validate the accuracy of the alarm by visually verifying the oil level with the oil level sight gage.

The advantage of using the ultrasonic oil level sensor is that monitoring of the oil level is continuous and does not rely on the scheduled walk around which can be hours or days or months before the low oil condition is observed and corrected.

The combining of the oil level sight gage with an ultrasonic oil level sensor cancels the short comings of using these devises individually. The oil level sight gage requirement to be physically present to view the oil level is negated by the ultrasonic oil level sensor 50 ability to constantly monitor the oil level and electronically annunciate the low oil condition to some remote monitoring site. The visual verification the oil level and oil quality, which is lacking when using the ultrasonic oil level sensor alone, is provided by the sight oil level gage.

The accurate determination of a small change in oil level is critical on rotating equipment using oil to lubricate ball bearings. An oil level change of as little of $\frac{1}{16}$" of an inch can cause the bearings to fail due to lack of lubrication. The ultrasonic oil level sensor used in the present invention is capable of accurately detecting small oil level changes.

This present invention is not limited to using an ultrasonic sensor with a oil level sight gage. For example, any sensor that is capable of detecting small changes in oil levels and has an electronic output and is small enough to be mounted to a oil level sight gage is can be used in combination with the oil level sight gage to provide reliable oil level monitoring.

This invention is not limited to screwing the ultrasonic oil level sensor into the oil level sight gage. The ultrasonic sensor head can be imbedded or molded in to the body of the oil level sight gage.

Figure 6:
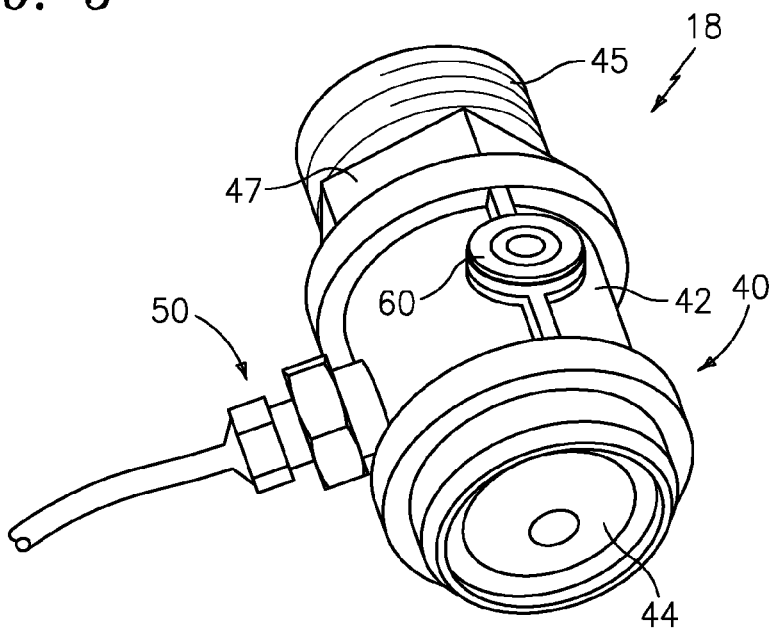
FIG. 6 shows a perspective view of a combined fluid level sight gage and ultrasonic sensor having a bubble level device according to some embodiments of the present invention.
Figure 7:
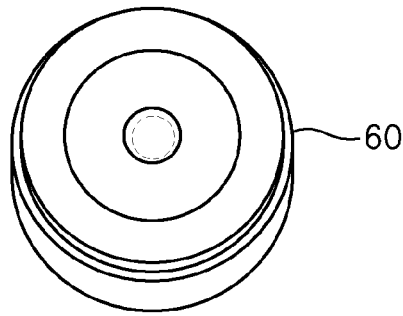
FIG. 7 shows a perspective view of the bubble level device that forms part of the combined fluid level sight gage and ultrasonic sensor shown in FIG. 6.

Another embodiment of the invention uses a bubble level 60 mounted on or in the oil level sight gage as depicted in FIGS. 6 and 7. The purpose of the bubble level 60 is to aid in the installation and leveling of the sensor glass oil level sight gage 40. Leveling the glass oil level sight gage 40 insures that the ultrasonic sensor 50 is positioned at the correct oil level setting. Bubble level like 60 are known in the art, and the scope of the invention is not intended to be limited to any particular type or kind thereof either now known or later developed in the future.

Other Applications

The combined sensor according to the present invention can be used on all oil lubricated rotating equipment, as it easily replaces existing sight level gages. For example, the present invention may used in relation to other pieces of lubricated rotating equipment such as gear boxes, fans, motors, compressors, crushers, virtually any piece of rotating equipment. It eliminates the need for the additional machining to accommodate the oil level or condition sensor. The oil level or condition sensor can be used on all of the lubricated rotating equipment, as it easily replaces existing sight level gages or constant level oilers.

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What is claimed is:

1. A pump or other suitable rotating device comprising:
a bearing frame or housing having a combined fluid level sight gage and ultrasonic sensor arranged therein;
the combined fluid level sight gage and ultrasonic sensor comprising a fluid level sight gage having a housing for containing a fluid for lubricating the pump or other suitable rotating device, the housing having a centerline for indicating a normal fluid level, the fluid level sight gage also having a sight glass arranged therein for viewing the level of the fluid therein; and
the combined fluid level sight gage and ultrasonic sensor also comprising an ultrasonic sensor arranged in a side of the housing of the fluid level sight gage and positioned or arranged at a location in relation to the centerline of the fluid level sight gage which corresponds to a lowest safe operating fluid level, the ultrasonic sensor being responsive to the level of fluid in the housing of the fluid level sight gage, for providing an ultrasonic sensor signal containing information about an electronic annunciation of a high, normal or low fluid level in the bearing frame or housing of the fluid for lubricating the pump or other suitable rotating device that is based at least partly on the position of the ultrasonic sensor in relation to the centerline that corresponds to the lowest safe operating fluid level.

2. A pump or other suitable rotating device according to claim 1, wherein the ultrasonic sensor is positioned or arranged in the side of the housing either above or below the centerline by about 1/16", 1/8" or 1/4".

3. A pump or other suitable rotating device according to claim 1, wherein the sight glass provides a visual verification that the ultrasonic sensor is working correctly in relation to the fluid visible in the sight glass.

4. A pump or other suitable rotating device according to claim 1, wherein the ultrasonic sensor signal is used to automatically annunciate alarms or warnings.

5. A pump or other suitable rotating device according to claim 1, wherein the ultrasonic sensor signal is used to annunciate alarms or warnings locally at the equipment or by wired or wireless electronic means.

6. A pump or other suitable rotating device according to claim 1, wherein the combined fluid level sight gage and ultrasonic sensor comprises a plurality of ultrasonic sensors, each ultrasonic sensor being arranged at a different position in relation to the centerline.

7. A pump or other suitable rotating device according to claim 1, wherein the combined fluid level sight gage and ultrasonic sensor comprises a bubble level mounted on or in the fluid level sight gage in relation to the centerline to aid in the installation and leveling of the fluid level sight gage.

8. A pump system comprising:
a pump comprising:
a bearing frame or housing having a combined fluid level sight gage and ultrasonic sensor arranged therein,
the combined fluid level sight gage and ultrasonic sensor comprising a fluid level sight gage having a housing for containing a fluid for lubricating the pump or other suitable rotating device, the housing having a centerline for indicating a normal fluid level, the fluid level sight gage also having a sight glass arranged therein for viewing the level of the fluid therein,
the combined fluid level sight gage and ultrasonic sensor also comprising an ultrasonic sensor arranged in a side of the housing of the fluid level sight gage and positioned or arranged at a location in relation to the centerline of the fluid level sight gage which corresponds to a lowest safe operating fluid level, the ultrasonic sensor being responsive to the level of fluid in the housing of the fluid level sight gage, for providing an ultrasonic sensor signal containing information about an electronic annunciation of a high, normal or low fluid level in the bearing frame or housing of the fluid for lubricating the pump that is based at least partly on the position of the ultrasonic sensor in relation to the centerline that corresponds to the lowest safe operating fluid level; and
a pump controller, responsive the ultrasonic sensor signal, for either control the operation of the pump, for providing an audio or visual warning, or some combination thereof.

9. A pump system according to claim 8, wherein the ultrasonic sensor is positioned or arranged in the side of the housing either above or below the centerline by about 1/16", 1/8" or 1/4".

10. A pump system according to claim 8, wherein the sight glass provides a visual verification that the ultrasonic sensor is working correctly in relation to the fluid visible in the sight glass.

11. A pump system according to claim 8, wherein the ultrasonic sensor signal is used to automatically annunciate alarms or warnings.

12. A pump system according to claim 8, wherein the ultrasonic sensor signal is used to annunciate alarms or warnings locally at the equipment or by wired or wireless electronic means.

13. A pump system according to claim 8, wherein the combined fluid level sight gage and ultrasonic sensor comprises a plurality of ultrasonic sensors, each ultrasonic sensor being arranged at a different position in relation to the centerline.

14. A pump system according to claim 8, wherein the combined fluid level sight gage and ultrasonic sensor comprises a bubble level mounted on or in the fluid level sight gage in relation to the centerline to aid in the installation and leveling of the fluid level sight gage.

15. A method comprising:
arranging a combined fluid level sight gage and ultrasonic sensor in a bearing frame or housing of a pump, where the combined fluid level sight gage and ultrasonic sensor comprises a fluid level sight gage having a housing for containing a fluid for lubricating the pump or other suitable rotating device, the housing having a centerline for indicating a normal fluid level, the fluid level sight gage also having a sight glass arranged therein for viewing the level of the fluid therein, and where the combined fluid level sight gage and ultrasonic sensor also comprising an ultrasonic sensor arranged in a side of the housing of the fluid level sight gage and positioned or arranged at a location in relation to the centerline of the fluid level sight gage which corresponds to a lowest safe operating fluid level; and sensing with the ultrasonic sensor the level of fluid in the housing of the fluid level sight gage; and providing an ultrasonic sensor signal containing information about an electronic annunciation of a high, normal or low fluid level in the bearing frame or housing of the fluid for lubricating the pump that is based at least partly on the position of the ultrasonic sensor in relation to the centerline that corresponds to the lowest safe operating fluid level.

16. A method according to claim 15, wherein the method comprises positioning or arranging the ultrasonic sensor in the side of the housing of the fluid level sight gage either above or below the centerline by about $1/16"$, $1/8"$ or $1/4"$.

17. A method according to claim 15, wherein the method further comprises automatically annunciating alarms or warnings in response to the ultrasonic sensor signal.

18. A method according to claim 15, wherein the method further comprises controlling a pump with a pump controller that responds the ultrasonic sensor signal, for either control the operation of the pump, for providing an audio or visual warning, or some combination thereof.

* * * * *